United States Patent
Stanley (10) Patent No.: US 7,404,904 B2
(45) Date of Patent: Jul. 29, 2008

(54) METHOD AND APPARATUS TO CLEAN PARTICULATE MATTER FROM A TOXIC FLUID

(76) Inventor: Melvin Stanley, 2021 King Air Ct., Port Orange, FL (US) 32128

( * ) Notice: Subject to any disclaimer, the term of this patent is extended or adjusted under 35 U.S.C. 154(b) by 0 days.

(21) Appl. No.: 11/070,719

(22) Filed: Mar. 1, 2005

(65) Prior Publication Data

US 2005/0145580 A1 Jul. 7, 2005

(51) Int. Cl.
*B01D 33/04* (2006.01)
*B01D 33/46* (2006.01)

(52) U.S. Cl. ................. 210/739; 210/783; 210/791; 210/106; 210/396; 210/400; 210/408; 210/409; 210/470; 210/495; 216/93

(58) Field of Classification Search ............. 210/768, 210/772, 780, 783, 784, 791, 805, 106, 107, 210/359, 384, 388, 391, 393, 396, 400, 407–413
See application file for complete search history.

(56) References Cited

U.S. PATENT DOCUMENTS

| | | | | | |
|---|---|---|---|---|---|
| 840,973 | A | * | 1/1907 | Todd | 210/156 |
| 1,076,483 | A | * | 10/1913 | Collar | 210/156 |
| 1,585,461 | A | * | 5/1926 | Brackett | 210/158 |
| 2,071,998 | A | * | 2/1937 | Buse | 210/804 |
| 2,748,071 | A | * | 5/1956 | Eisler | 204/208 |
| 2,885,080 | A | * | 5/1959 | Goldman | 210/160 |
| 2,964,453 | A | * | 12/1960 | Garn et al. | 205/772 |
| 3,225,928 | A | * | 12/1965 | Black | 210/121 |
| 3,394,060 | A | * | 7/1968 | Douglas | 205/498 |
| 3,400,027 | A | * | 9/1968 | Caropreso et al. | 216/93 |
| 3,455,457 | A | * | 7/1969 | Popelar | 210/168 |
| 3,526,560 | A | * | 9/1970 | Thomas | 156/345.15 |
| 3,600,244 | A | * | 8/1971 | Wegener | 216/93 |
| 3,637,080 | A | * | 1/1972 | Markel | 210/769 |
| 3,783,113 | A | * | 1/1974 | Newton et al. | 205/412 |
| 3,784,455 | A | * | 1/1974 | Parikh et al. | 216/93 |
| 3,785,950 | A | * | 1/1974 | Newton et al. | 204/239 |
| 3,788,915 | A | * | 1/1974 | Gulla | 216/93 |
| 3,802,565 | A | * | 4/1974 | Hughes et al. | 210/160 |

(Continued)

OTHER PUBLICATIONS

D. M. Allen, Etching of iron with ferric chloride solution as a model for a technical and economic comparison of three spent etchant regeneration systems, Processing of Advanced Materials (1991) 1, 69-75.

(Continued)

*Primary Examiner*—Robert James Popovics
(74) *Attorney, Agent, or Firm*—Lewis Anten; Ying Chen (57) ABSTRACT

There is a method of capturing, removing or collecting the particulate matter from a fluid containing a toxic liquid reaction and particulate matter produced from the reaction. The method includes partly or completely disposing a screen into the toxic fluid. Mixing the toxic fluid allowing the particulate matter to contact the screen. Moving the screen to capture the particulate matter on the screen. Removing the particulate matter from the screen by washing or scraping. There is also a cleaning apparatus to capture, remove or collect particulate matter from a toxic fluid. A cleaning apparatus contains at least a screen and a structure securing the screen. The cleaning apparatus can optionally include a scraping or washing means, a drive means, a flow inducer and a housing structure.

8 Claims, 5 Drawing Sheets

U.S. PATENT DOCUMENTS

| | | | |
|---|---|---|---|
| 3,843,504 A * | 10/1974 | Nayder | 205/471 |
| 3,855,141 A * | 12/1974 | Ruff | 423/23 |
| 3,976,573 A * | 8/1976 | Miller | 210/158 |
| 4,042,507 A * | 8/1977 | Langmack | 210/158 |
| 4,051,001 A * | 9/1977 | Inoue et al. | 216/93 |
| 4,107,011 A * | 8/1978 | Kucherenko et al. | 205/755 |
| 4,261,827 A * | 4/1981 | Bronnec | 210/242.3 |
| 4,261,959 A * | 4/1981 | Kim et al. | 423/139 |
| 4,319,922 A * | 3/1982 | Macdonald | 75/741 |
| 4,490,224 A * | 12/1984 | Warheit | 205/574 |
| 4,557,811 A * | 12/1985 | Fürst et al. | 205/772 |
| 4,812,231 A * | 3/1989 | Wiesemann | 210/158 |
| 5,035,778 A * | 7/1991 | Bindra et al. | 205/770 |
| 5,085,730 A * | 2/1992 | Cordani | 216/93 |
| 5,089,121 A * | 2/1992 | McWhinnie | 210/175 |
| 5,108,620 A * | 4/1992 | Wester et al. | 210/725 |
| 5,141,616 A * | 8/1992 | Heinke | 204/208 |
| 5,284,505 A * | 2/1994 | Tachibana et al. | 75/738 |
| 5,300,221 A * | 4/1994 | Austevoll | 210/155 |
| 5,368,732 A * | 11/1994 | Pierson | 210/386 |
| 5,417,955 A * | 5/1995 | Connolly | 423/488 |
| 5,421,966 A * | 6/1995 | Oxley | 205/507 |
| 5,456,795 A * | 10/1995 | Danjo et al. | 216/93 |
| 5,470,473 A * | 11/1995 | Park et al. | 210/402 |
| 5,531,889 A * | 7/1996 | Baron et al. | 210/805 |
| 5,560,838 A * | 10/1996 | Allies et al. | 216/93 |
| 5,565,093 A * | 10/1996 | Frankenberger | 210/158 |
| 5,569,382 A * | 10/1996 | Reynders | 210/391 |
| 5,571,404 A * | 11/1996 | Derenthal | 210/97 |
| 5,589,079 A * | 12/1996 | Park et al. | 210/784 |
| 5,603,846 A * | 2/1997 | Uchiyama et al. | 210/784 |
| 5,643,468 A * | 7/1997 | Ure | 210/771 |
| 5,676,829 A * | 10/1997 | Cotterill | 210/158 |
| 5,676,847 A * | 10/1997 | Yamamoto et al. | 210/784 |
| 5,858,218 A * | 1/1999 | Setlock et al. | 210/167 |
| 5,961,847 A * | 10/1999 | Creps et al. | 210/783 |
| 6,029,290 A * | 2/2000 | Butcher et al. | 4/490 |
| 6,309,540 B1 * | 10/2001 | Chang | 210/159 |
| 6,332,983 B1 * | 12/2001 | Tashiro et al. | 210/297 |
| 6,500,347 B2 * | 12/2002 | Ohkoshi et al. | 210/772 |
| 6,551,521 B1 * | 4/2003 | Culpovich et al. | 216/84 |
| 6,571,959 B1 * | 6/2003 | Moore et al. | 210/394 |
| 6,906,227 B2 * | 6/2005 | Neumann et al. | 568/724 |
| 7,056,424 B2 * | 6/2006 | De Boer et al. | 204/290.01 |
| 7,238,295 B2 * | 7/2007 | Izuta et al. | 216/93 |
| 2003/0062317 A1 * | 4/2003 | Stanley | 210/702 |
| 2003/0141198 A1 * | 7/2003 | De Boer et al. | 205/475 |
| 2004/0200806 A1 * | 10/2004 | Izuta et al. | 216/99 |
| 2005/0042156 A1 * | 2/2005 | Scholz et al. | 423/34 |
| 2005/0118085 A1 * | 6/2005 | Satchell, Jr. | 423/240 R |
| 2005/0145580 A1 * | 7/2005 | Stanley | 210/780 |

OTHER PUBLICATIONS

David M. Allen and Leong T. Ler, Increasing utilisation efficiency of ferric chloride etchant in industrial photochemical machining, J. Environ. Monit. 1999, 1, 103-108.

* cited by examiner

METHOD AND APPARATUS TO CLEAN PARTICULATE MATTER FROM A TOXIC FLUID

BACKGROUND OF THE INVENTION

1. Field of the Invention

This invention relates to an improved method and apparatus to capture, remove or collect unusable products, more particularly, particulate matter from a fluid containing a liquid reaction. The liquid reaction of the fluid further containing unwanted waste products, more particularly, particulate matter.

In particular, this invention uses a screen to capture the particulate matter from a liquid reaction. The screen is a hand-held device or the screen is part of an apparatus, which may optionally include scrapers, drivers, rollers and artificial flow inducers.

More particularly, the hand-held screen or the screen apparatus is partially or completely disposed into a fluid and contacting the fluid such that it captures, removes or collects particulate matter from the fluid.

2. General Background and State of the Art

Many industrial chemical processes have by-products in the form of particulate matter, which impedes or ceases further processing if the by-product is not removed, captured or collected from the reaction. In particular, particulate matter (PM), are small solids suspended in water or liquid solution. Particulate matter vary in size, shape, density, and electrical charge. Often the PM disrupts the normal chemical reaction or prevents recycling or regeneration of a fluid system.

Regeneration of a system, for example, regeneration of starting materials from the products of a chemical reaction, prevents otherwise constant rejuvenation by having to purchase and add new starting materials. The endless process of adding new starting materials is expensive and not cost effective. In addition, constant rejuvenation of starting materials poses various potential health and safety issues associated with the disposal of the "spent" products. For example, the health and safety of handling and storing large quantities of a reagent/chemical, or waste.

Therefore, it is advantageous to improve methods to capture, remove or collect particulate matter (PM) from a fluid containing a liquid reaction to prevent further supplying the reaction with new starting materials.

It is further advantageous to capture, remove or collect any or all PM from such fluids to allow or improve the regeneration of the starting materials.

Further, effective regeneration of the starting materials is cost effective and prevents having to safely store any waste or unwanted products of a liquid reaction.

INVENTION SUMMARY

The present invention is directed to a method and an apparatus for capturing, removing or collecting particulate matter (PM) from a circulating or non-circulating fluid. The fluid is further comprised of a liquid reaction. The liquid reaction is further comprised of PM.

In accordance with another aspect of the present invention there is provided a method of capturing PM from a fluid. The method providing for a fluid containing a liquid reaction including PM from the reaction. If the fluid does not have a circulating means, then the method also provides for a circulating means to mix the fluid. The circulating means is comprised of a flow inducer connectable to a pump.

To capture and remove the PM from the fluid, a screen is partly or completely disposed into the fluid. Movement of the screen captures the PM. Further movement of the screen removes the PM from the fluid.

In accordance with another aspect of the present invention there is provided a method of moving the screen. Movement of the screen is by a manual means or by a drive means. The speed of the screen is dependent on the amount of captured PM from the fluid.

In accordance with another aspect of the present invention, a method is provided for cleaning the PM from the screen including a scraping step, a flicking step, or a washing step.

In accordance with another aspect of the present invention, a method is provided for a disposable screen with a substantially limited number of uses over a period of time.

Still in accordance with another aspect of the present invention there is provided a cleaning apparatus to capture PM from a fluid comprising of a screen and a structure to support the screen.

The screen contains a plurality of holes for capturing, removing or collecting PM from a fluid. The screen can be an endless screen or it take other forms such as a simple hand-held screen. The screen can also be supported on one or more rollers or it can be supported on a frame. Movement of the screen such that it contacts the fluid can be manual or by a drive means. The drive means can be motorized by one or more motors.

In accordance with another aspect of the present invention there is provided a cleaning apparatus wherein the speed of the screen can be controlled and the speed being dependent on the degree of captured PM on the screen.

In accordance with another aspect of the present invention there is provided a cleaning apparatus comprising a means to clean the screen including a scraper.

DETAILED DESCRIPTION OF THE PREFERRED EMBODIMENTS

While the specification describes particular embodiments of the present invention, those of ordinary skill in the art can devise variations of the present invention without departing from the inventive concept.

The present invention provides methods for cleaning a fluid containing a liquid reaction and particulate matter (PM) from the liquid reaction. First, there is provided a fluid vessel containing a liquid reaction. The liquid reaction contains all components (i.e. reagents, products, by-products) have that reaction and any PM produced from the reaction. Fluids can be circulating or non-circulating. In a non-circulating fluid mechanism there is provided a means to circulate or mix the fluid. Mixing the fluid allows for even distribution of reaction components.

In most liquid reactions, build-up of PM impedes reaction rates. Therefore, capture of the PM from the liquid reaction increases reaction efficiency. To capture the PM, the present invention provides for method whereby a screen 5 is partly or completely disposed into the fluid.

The screen 5 is comprised of a plurality of holes. The size of the holes is dependent on the size of the PM in the reaction. The screen 5 is optionally supported by at least two rollers 10. Alternatively, the screen 5 is supported by a simple frame structure 15, and further connected to a handle 20 for manual manipulation.

Movement of the screen 5 is necessary to capture the PM. If the screen 5 is supported by at least two rollers 10, movement of the rollers 10 by a drive means 12 moves the rollers 10 and the screen 5. If the screen 5 is supported by a frame structure 15, then grasping or holding on to the handle 20 and moving it manually is sufficient to move the screen 5 to capture the PM.

The drive means 12 is motorized by at least one motor. The drive means 12 also contains a regulating means 20 to control the speed of the rollers 10 and the screen 5. The speed of the rollers 10 and the screen 5 is determined upon the degree of captured or removed PM from the moving screen 5. For example, in a liquid reaction producing small quantities of PM, the speed of movement of the rollers 10 and screen 5 is slow. In contrast, if the liquid reaction produces large to copious quantities of PM, then the speed of the rollers 10 and screen 5 is faster. This type of cleaning apparatus is shown in FIGS. 1-4.

Figure 5:
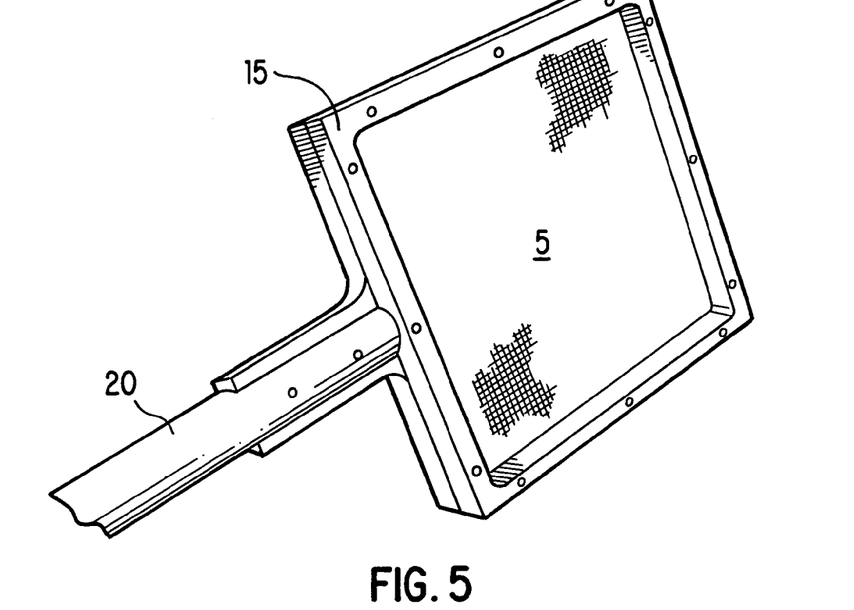
FIG. 5 is an inferior view one type of cleaning apparatus.
Figure 6:
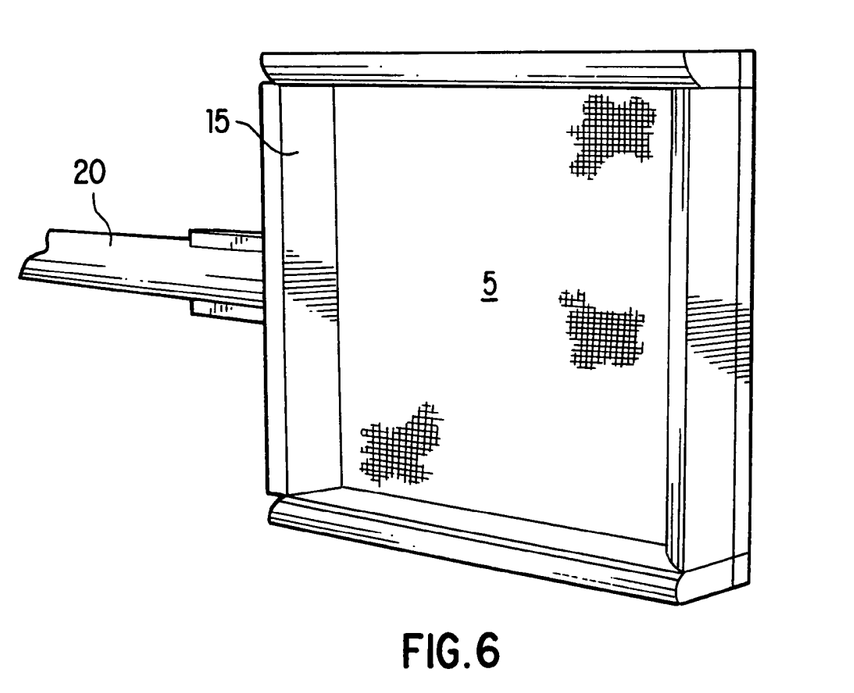
FIG. 6 is a superior view of one type of cleaning apparatus.

If using a simple screen 5 attached and supported by a frame structure 15 then adjustment of the speed of the cleaning apparatus is accomplished manually. This type of cleaning apparatus is shown in FIGS. 5 and 6.

The present invention also provides for removing the PM from the screen 5. If the screen 5 is the type that is supported by rollers 10, movement of the rollers 10 and screen 5 by the drive means 12 moves the captured PM on the screen in close proximity to or contact with the scraping means 25. The PM on the screen 5 moves past and contacts the scraping means 25, and the scraping means 25 removes the PM off the screen 5. This method allows for continuous use of the screen 5.

If the screen 5 is supported by frame structure 15, then removing the screen 5 and frame structure 15 out of the fluid and flicking the PM off the screen is sufficient. In another method, removing the screen 5 and frame structure 15 out of the fluid and rinsing or washing the screen 5 also works.

The present invention also provides for methods similar to that described above, except using a disposable screen 5 with a limited number of uses over a period of time. For example, a disposable screen 5 is used for every 12-72 hours of operation. In such a system, a new disposable screen 5 is attached and the screen 5 is properly disposed of.

The present invention also provides for a cleaning apparatus 1 to capture, remove or collect the PM from a fluid containing a liquid reaction, further containing by-products of that reaction, in particular, PM. The cleaning apparatus 1 contains at least a screen 5. The screen 5 is comprised of a plurality of holes and functions as a molecular sieve. Thus, the size of the holes is dependent on the size of the PM in the fluid. For example, holes can be microns, millimeters or centimeters in diameter depending on the size of the PM in any particular fluid. The screen 5 is fabricated out of a material that is resistant to degradation by the fluid. For example, if the fluid contains a liquid reaction that is acidic, then the screen 5 used is an acid-resistant screen 5. An acid resistant screen 5 can be made out of polypropylene or any other acid-resistant materials, which allows for fabrication of a screen 5.

Alternatively the screen 5 can be disposable. Disposable screens 5 have limited lifetime of use. The lifetime of the screen 5 can be dependent on the size of the PM captured, or it can be limited by the amount of hours of use.

One or more rollers 10 can support the screen 5, or the screen 5 can be supported by a frame structure 15 with a handle 20. For example, if one or more rollers 10 support a screen 5, the screen 5 is an endless screen 5, as shown in FIGS. 1-4.

In FIGS. 1-4, the cleaning apparatus 1 has a first end 30 and a second 35 end. The first end 30 of the screen 5 is in contact or substantially in close proximity to the fluid and the second end 35 of the screen 5 is at a location above and out of the fluid. Such that in use, the cleaning apparatus 1 of FIGS. 1-4 is at an angle relative to the top of the fluid.

If, however, the screen 5 is supported by a frame structure 15, then partial or complete immersion of the screen 5 and frame structure 15 into the fluid is recommended.

The present invention also provides for a drive means 12 to move the rollers 10 and the screen 5. Movement of the rollers 10 and the screen 5 ensures that the screen 5 continues to capture or remove the PM from the fluid. For example, the drives means 12 would move the rollers 10 and screen 5 into a first position, whereby the screen 5 is contacting and capturing the PM in the fluid. The drive means 12 then moves the rollers 10 and screen 5 to a second position.

To remove the PM off the screen 5 and allow for continued use of the screen 5, the PM is removed or collected from the screen 5 when the movement of the screen is in the second position. Then a scraping device 25 located in proximity to the second end 25 of the screen 5 removes or collects the PM from the screen 5.

However, the scraping device 25 can be placed in various locations on or near the screen 5. For example, the scraping device 25 can be conveniently placed above a separate holding tank, whereby when the PM on the screen 5 is moved past the scraping device 25, the PM is removed from the screen 5 and is collected in the holding tank.

The drive means 12 is motorized by one or more motors and also contains a regulating device 20 for controlling the speed of the screen 5. Regulating the speed of the screen 5 is described as above.

The present invention also provides for a flow inducer device 38. The flow inducer device 38 is connectable to a pump (not shown). The flow inducer 38 would be used to circulate and mix fluid contents when there is not otherwise present a means to mix the fluid.

The cleaning apparatus can also be enclosed in a housing structure 40, as shown in FIGS. 1-4. The housing structure 40 encloses at least one component of the cleaning apparatus, for example, the screen 5. The housing structure 40 can also be optionally attached to other components of the cleaning apparatus including the rollers 10, the drive means 12, the regulating means 20 of the drive means 12, the flow inducer 38, and the scraping means 25.

The present invention is illustrated by the following example. This Example is presented for illustration only and is not intended to limit the invention.

The example is presented in terms of one liquid reaction for use in photochemical machining. The liquid reaction first converts $Fe^{3+}$ to $Fe^{2+}$, and secondly it regenerates $Fe^{2+}$ back to $Fe^{3+}$. The PM frustrates the regeneration reaction and inhibits the functionality of the regenerated material. Hence, by removing the PM from the regeneration reaction, the regeneration of $Fe^{3+}$ is allowed to continued uninterrupted.

EXAMPLE 1

Photochemical Machining

Photochemical machining (PCM) is a non-conventional method of manufacturing parts by employing a combination of photoresist and chemical etching techniques. Metal removal is achieved by dissolving the surface of the metal showing through apertures in a resist stencil. The most commonly used etchant is an aqueous solution of ferric chloride ($FeCl_3$), which is normally used from room temperature up to about 50° C. It is relatively cheap, comparatively innocuous and versatile, attacking copper, nickel, iron, aluminum and their alloys.

$FeCl_3$ solutions are acidic and strong oxidizing agents as shown by the standard reduction.

$$Fe^{3+}(aq) + e- \rightarrow Fe^{2+}(aq) \quad E° 32\ 0.77v \qquad (1)$$

With regard to equation (1) above, typically $Fe^{3+}$ (aq) exists as chloro-aquo complexes, the exact composition of which is dependent on $Fe^{3+}$ and $Cl^-$ concentrations.

Once concentrations of $Fe^{2+}$ build up to a certain level etching rates and quality deteriorate. Hence, at some point, the etchant solution is disposed of or returned to the supplier when the etch rate decreases to an unacceptable level for production caused by the contaminants and build up of PM.

Etchant regeneration is the process by which 'spent' etchants are oxidized back to a reusable form. For example, in an etching facility, the need to regenerate, dispose, and/or replace an etchant is typified by slower etch rates and poorer quality finishes. Regenerating, disposing, and/or replacing 'spent' etchants, or "contaminants", prevents increasing concentration of by-products. Owing to the increasing public concern for the environment, disposal of contaminants is more restrictive and therefore more expensive.

However, $Fe^{3+}$ (equation 1) can be easily regenerated from $Fe^{2+}$ by a variety of chemical oxidation methods. For example, a regeneration of waste etchant to reform $Fe^{3+}$ can be achieved as follows:

$$2Fe^{3+}(aq) + Fe(s) \rightarrow 3Fe^{2+}(aq) \rightarrow 3Fe^{3+}(aq) \qquad (2)$$

Whereby the first reaction (first arrow) is the etching reaction and the second reaction (second arrow) is a chemical oxidation reaction. Moreover, more $Fe^{3+}$ is made from the chemical oxidation, regenerating reaction than was initially used in the etching of iron ($3Fe^{3+}$ versus $2Fe^{3+}$). In order to maintain a constant etch rate, the $3Fe^{3+}$ products are diluted with water.

Various regeneration systems have been developed for regeneration of etchants used in the PCB industry including sodium chlorate and hydrochloric acid regeneration, electrolytic regeneration and ozone regeneration.

In the United States the most common regeneration system is that based on chlorine oxidation as follows:

$$2Fe^{2+}(aq) + Cl_2(g) \rightarrow 2Fe^{3+}(aq) + 2Cl^-(aq) \quad E°=0.59v \qquad (3)$$

The overall stoichiometry of the regeneration is then:

$$2FeCl_3 + Fe \rightarrow 3FeCl_2 \rightarrow 3FeCl_3 \qquad (4)$$

Whereby the first reaction (first arrow) is the etching reaction and the second reaction (second arrow) is the regeneration reaction. Thus for every 1 Kg of iron etched, 5.808 Kg of $FeCl_3$ are consumed together with 1.904 Kg of $Cl_2$ to produce 8.712 Kg of $FeCl_3$ for further etching (Allen, D. M. 1991, *Processing of Advanced Materials*, 1:69-75).

Thus, capturing, removing or collecting the PM or contaminants using a cleaning apparatuses and methods as described above comprising a screen 5 improves the efficiency of the regeneration system.

Other modifications to the embodiments can be achieved without departing from the scope of the invention.

The method for example can be modified and the various steps repeated or performed in a different order. For example, a screen 5 can be disposed partly or completely in the fluid and then the pump connected to the flow inducer 38 is turned on. Conversely, the pump connected to the flow inducer 38 can be turned on first to allow for mixing of the fluid prior to disposing of the screen 5 into the fluid.

Alternatively, a screen 5 can be disposed completely in a circulating or non-circulating fluid, moved to capture the PM and then removed to a position out of the fluid for cleaning or scraping.

Also, mixing the fluid can be automated or non-automated. For example, the non-circulating fluid can be circulated, stirred, or mixed by hand using a hand-held stirring device.

The scraping means 25 can also have other embodiments. For example, the screen 5 can simply be removed from the rollers 10 or frame structure 15 and washed off with water or detergent.

The cleaning apparatus 1 can also have various modifications. For example, there is at least one screen 5. However, more than one screen 5 can be used and may be necessary to capture different size PM in a fluid. In such a situation, the first screen 5 is at a first level and has a particular hole diameter. Whereas, the second, or third screen 5 is at a second or third level and has the same hole diameter, or a smaller or larger hole diameter, to capture the PM in the fluid.

Also, the holes in the screen 5 can be of different shapes and arranged in different patterns. The screen 5 can be fabricated to have homogenous population of holes, or it can be fabricated to contain several different sizes and shapes of holes. Again, the diameter of the holes are dependent on the size of the PM in a liquid reaction.

The above modifications can also be for use with disposable screens 5.

In a preferred embodiment, rollers 10 support at least one screen 5 or by a frame structure 15 attached to a handle 20. Alternatively, the screen 5 can be manipulated manually and is not attached to any fixed roller(s) 10 or frame structure 15. The screen 5 can also be attached to a flexible frame structure 15 containing a handle 20. A flexible frame structure 15 and handle 20 allows for variable angle of movement of the screen 5 to capture the PM in the fluid.

Also, the frame structure 15 supporting the screen 5 or the screen 5 being disposed in a housing structure 40, can be other shapes than the rectangular shape as described above and shown in the FIGS. 1-6. For example, for a circular or oblong shape fluid vessel, a frame structure 15 that is likewise circular or oblong is more efficient at capturing the PM around the fluid vessel wall than is one that is rectangular or square.

In addition, the screen 5 can be of different size depending on the size of the fluid vessel and depending on the use of the screen 5.

The screen 5 on a frame structure 15 can also be attached to a drive means 12 motorized by one or more motors to automate the movement of the screen 5.

Also, the screen 5 can be fabricated of different materials other than an acid-resistance material. The material composition of the screen 5 is dependent on the type of chemical reaction in the fluid vessel. For example, if the liquid reaction is a very basic or alkaline reaction, then a screen 5 that is resistant to degradation in this system is used. In another example, if a liquid reaction occurs at very high temperatures, a screen 5 that is resistant to melting at high temperatures is necessary. In contrast, if a liquid reaction occurs at very low (i.e., below freezing) temperatures, then a screen 5 resistant to cracking is used.

The scraping means 25 can be fabricated out of many different materials including rubber, polypropylene, plastic, metal alloys, etc. There can be more than one scraping means 25, for example, at different locations on the screen 5. The scraping means 25 can be detachable for easy cleaning or replaced.

The number of rollers 10 supporting the screen 5 described above is at least two. However, it can be two or more depending on the nature of the liquid reaction and the structure and type of fluid vessel used.

At least one drive means 12 is moving the rollers 10 and the screen 5. However, more than one drive means 12 can be used.

Figure 1:
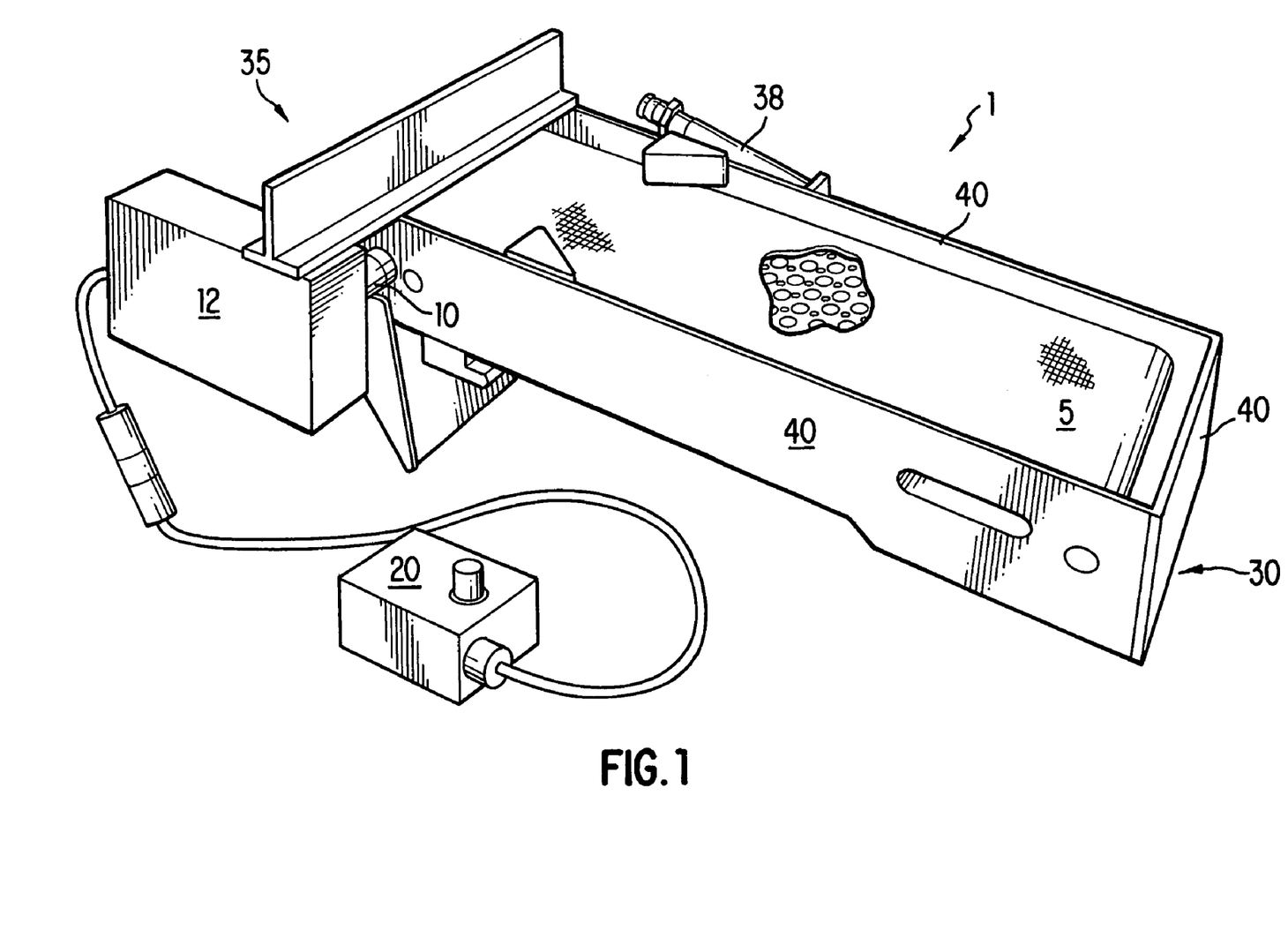
FIG. 1 is a front and side view of one type of cleaning apparatus.
Figure 2:
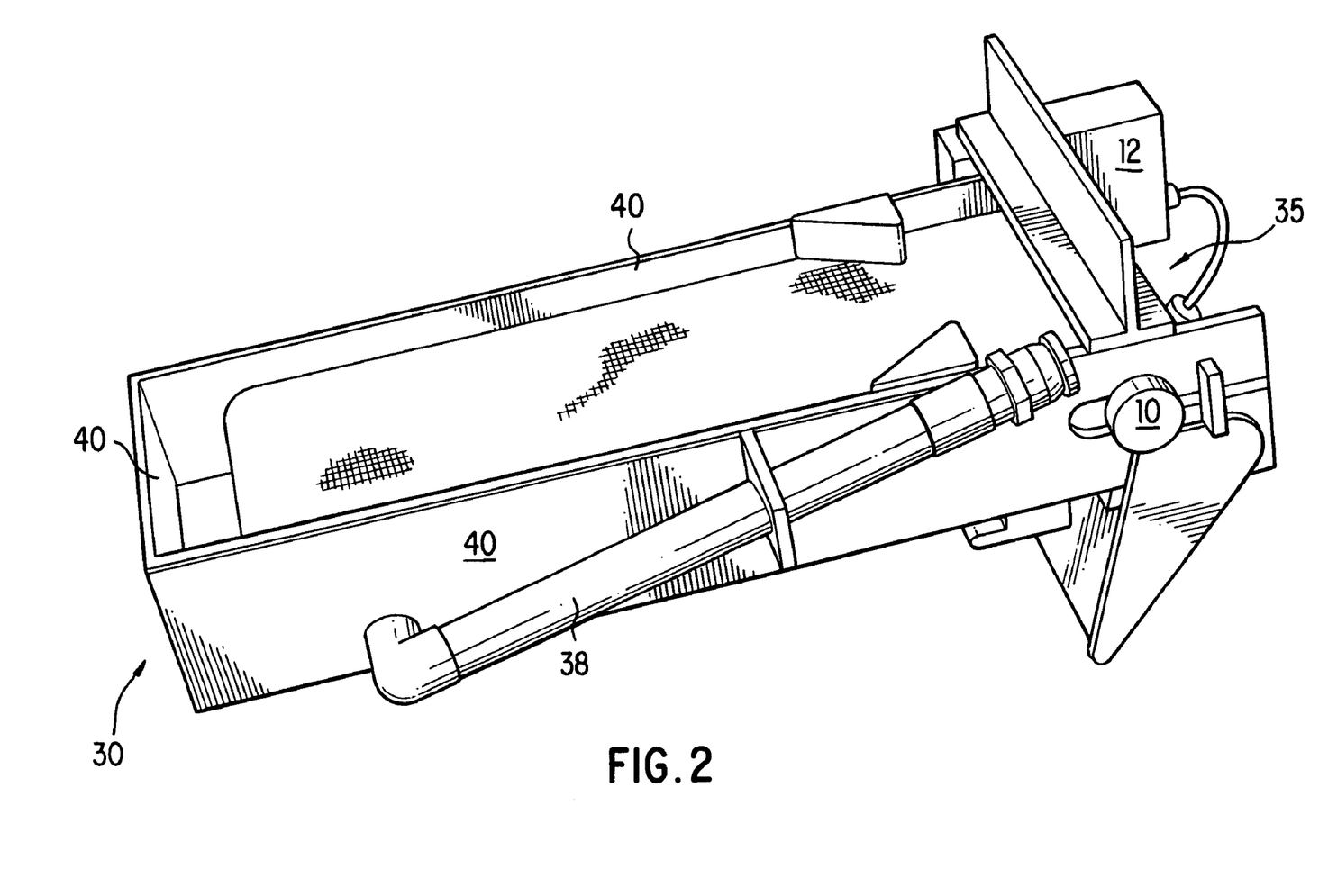
FIG. 2 is another side view one type of cleaning apparatus including an artificial flow inducer tube.
Figure 3:
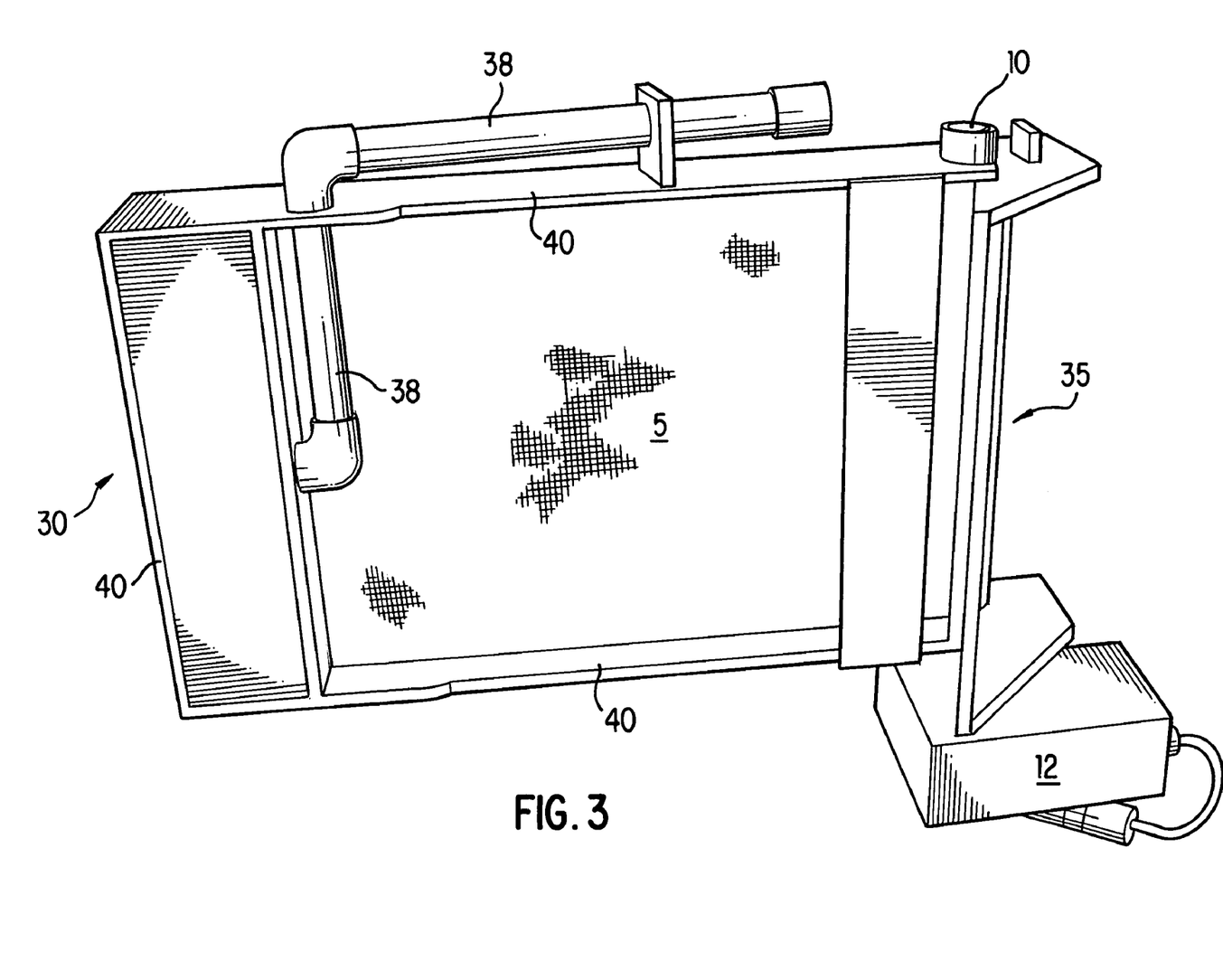
FIG. 3 is an inferior view one type of cleaning apparatus.
Figure 4:
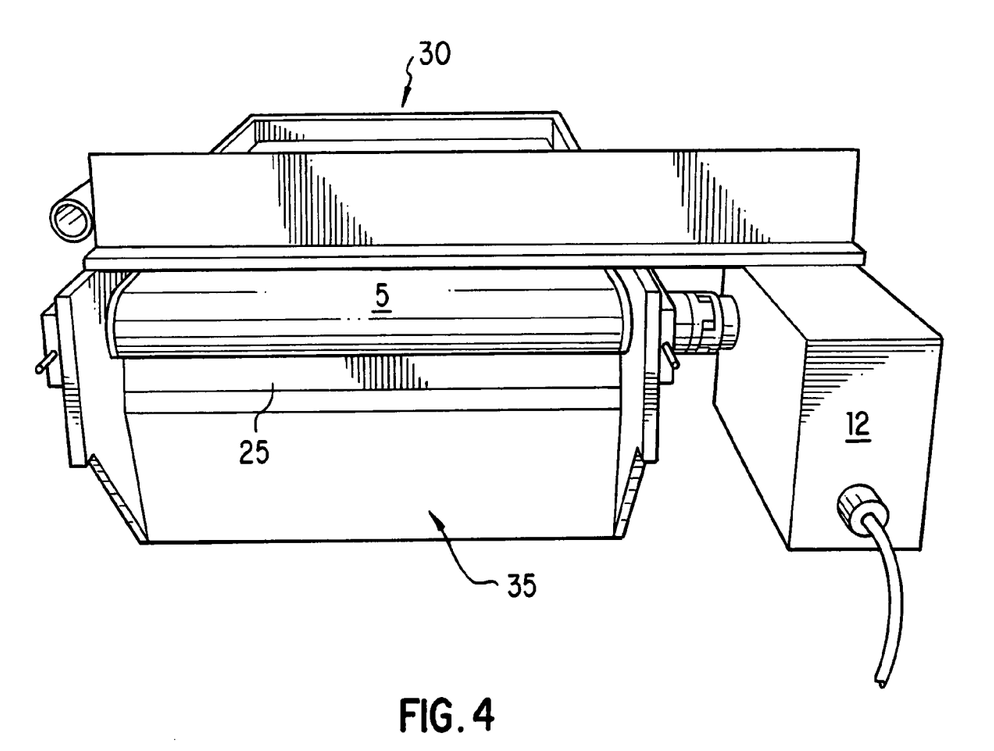
FIG. 4 is posterior view one type of cleaning apparatus.

FIG. 1, describes the structure of the plate 50 underneath the screen 5. The plate 50 can have a different pattern, and the plate 50 can be detachable.

FIG. 1-4 shows the screen 5 enclosed in a housing structure 40. However, the screen 5 can be removed from the housing structure 50 described and still capture the PM from the fluid.

Although preferred and other embodiments of the invention have been described herein, other embodiments may be perceived by those skilled in the art without departing from the scope of the invention as defined in the following claims.

What is claimed is:

1. A method of treating a product of a chemical reaction to regenerate a starting material of the chemical reaction, comprising:

reacting the product with a chemical agent to produce a fluid containing regenerated starting material in a liquid form and particulate matter suspended in the fluid; and capturing the particulate matter from the fluid, including the steps of:
a. circulating the fluid;
b. disposing a screen in partial or complete contact with the fluid;
c. moving said fluid through said screen;
d. moving the screen within said fluid by motorized drive means;
e. capturing or collecting the particulate matter on the screen; and
f. removing said particulate matter captured on said screen.

2. A method as claimed in claim 1, said method further including the step of regulating the speed of the screen based on the amount of particulate matter in the fluid.

3. A method as claimed in claim 1, said method further including the step of scraping said screen to remove the particulate matter captured on the screen.

4. A method as claimed in claim 1, said method further including the step of flicking or brushing said screen to remove the particulate matter captured on the screen.

5. A method as claimed in claim 1, said method further including the step of washing said screen to remove the particulate matter captured on the screen.

6. A method as claimed in claim 1, wherein the screen is disposable or has substantially limited number of uses over a period of time.

7. The method of claim 1, wherein screen is made of a material resistant to degradation by the fluid.

8. The method of claim 1, wherein the chemical reaction is chemical etching and a starting material is an etchant.

* * * * *